United States Patent

[11] 3,599,283

[72] Inventors Robert E. Budai;
Philip McDowell, both of Downsview, Ontario, Canada
[21] Appl. No. 821,720
[22] Filed May 5, 1969
[45] Patented Aug. 17, 1971
[73] Assignee G & B Automated Equipment Limited
Downsview, Ontario, Canada

[54] MACHINE FOR USE IN THE MANUFACTURE OF GRINDING WHEELS
6 Claims, 14 Drawing Figs.
[52] U.S. Cl. .................................................... 18/5 R,
18/16 E, 18/16 F, 18/34 R
[51] Int. Cl. ......................................................... B29d 31/00
[50] Field of Search ........................................... 18/16 E, 16
F, 34 R, 5 R

[56] References Cited
UNITED STATES PATENTS
| | | | |
|---|---|---|---|
| 2,127,994 | 8/1938 | Davis et al. .................. | 18/16 (F) X |
| 2,592,768 | 4/1952 | Van Der Pyl ................ | 18/16 (E) |
| 3,183,570 | 5/1965 | Vogt ............................. | 18/16 (F) |
| 3,391,423 | 7/1968 | Charvat et al. .............. | 18/34 (R) X |

*Primary Examiner*—William S. Lawson
*Attorney*—Peter Kirby

ABSTRACT: A machine with a worktable in which a mold cavity is formed. A hopper discharges grinding wheel mix into this cavity. The hopper has a complex rotational movement which serves to distribute the mix uniformly throughout the mold cavity. The filled mold cavity is then transferred to a press.

MACHINE FOR USE IN THE MANUFACTURE OF GRINDING WHEELS

BACKGROUND OF THE INVENTION

This invention relates to a machine for use during the manufacture of grinding wheels.

As is well known, grinding wheels are made by first compressing and subsequently firing a charge of granular material (mix) that has been previously prepared in accordance with the particular characteristics desired in the final wheel. For example, there are resinoid mixes and vitrified mixes, and each manufacturer of grinding wheels has his own recipes of specific ingredients. Such variations do not, however, alter the fact that the material of the mix, when ready for molding, will have a granular but somewhat tacky consistency. This material is distributed throughout a mold which is then placed under the ram of a press, where the material is subjected to high pressure to be compacted to about a half of its original volume. The result is a semifinished grinding wheel which is sufficiently firm and has sufficient mechanical strength to be handled as a unit. It is then passed to a kiln or oven for baking.

The present description is concerned with an improved machine for carrying out these preliminary steps (mold-filling and compression) sequentially and automatically.

In its broad aspects the invention is concerned with a machine for improving the mold-filling process by enabling the same to be carried out more quickly and reliably than has previously been possible. The machine is especially concerned with achieving uniformity of distribution of the material throughout the mold. It will be understood that uniformity is of great importance in the manufacture of grinding wheels, since close tolerances must be achieved in the balance of the final product to avoid the appearance of destructive centrifugal forces when the wheel is rotated at high speed.

All grinding wheels are tested at 150 percent of rated speed before being used, and numerous failures result from this test. One of the objects of the present invention is the reduction of this failure rate, coupled with an increased safety in those wheels that pass the test.

Further objects and advantages of the invention will be apparent from the specific description which follows, which description is to be read with the accompanying drawings. This specific description is, however, only provided by way of example of the present invention, the broad scope of which is defined in the appended claims.

BRIEF DESCRIPTION OF DRAWINGS

Figure 1:
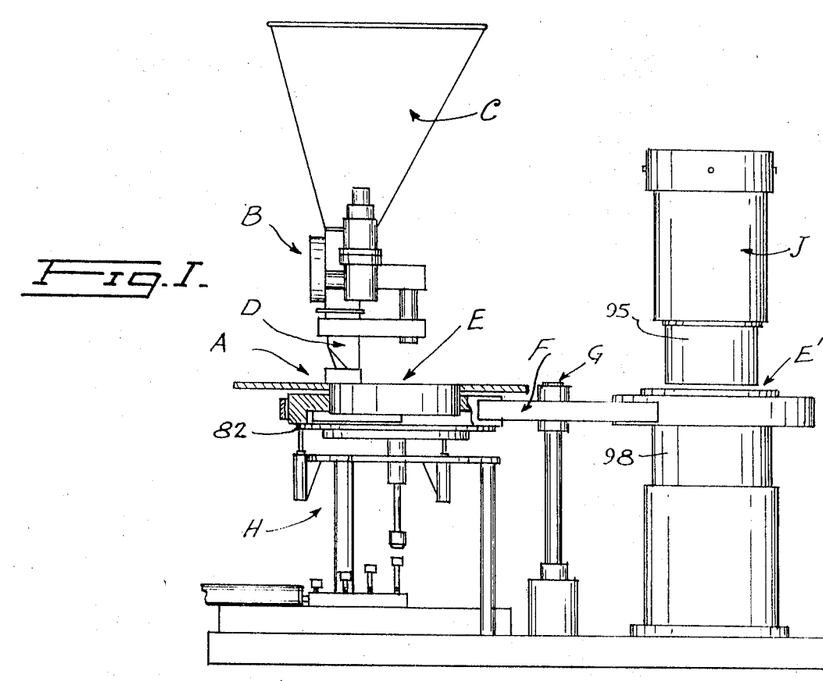
FIG. 1 is an overall view of the main working parts of the machine.

The accompanying drawings show a machine for carrying the invention into practice, in which drawings:

FIG. 11 is a view similar to FIG. 10 with the parts in another position;

OVERALL STRUCTURE OF THE MACHINE (FIG. 1)

As seen in FIG. 1, the machine comprises a mold-forming table, shown generally at A, with a material feeding assembly B including an input hopper C and a shuttle hopper mechanism D for supplying mix material to this table. Mounted within and forming part of the table A is a mold-forming mechanism E mounted on one end of a swing arm F centrally and pivotally supported at G. A second, similar, mold-forming mechanism E' is mounted on the other end of the swing arm F, so that either the mechanism E (as shown) or the mechanism E' can be brought into alignment with a cavity in the table A and, at the same time, into alignment with an elevating mechanism H situated beneath the table A. At the other end of the machine there is located a press J, with which the particular mechanism E or E' not currently aligned with the table A is aligned.

These various parts will now be separately described in detail.

Figure 2:
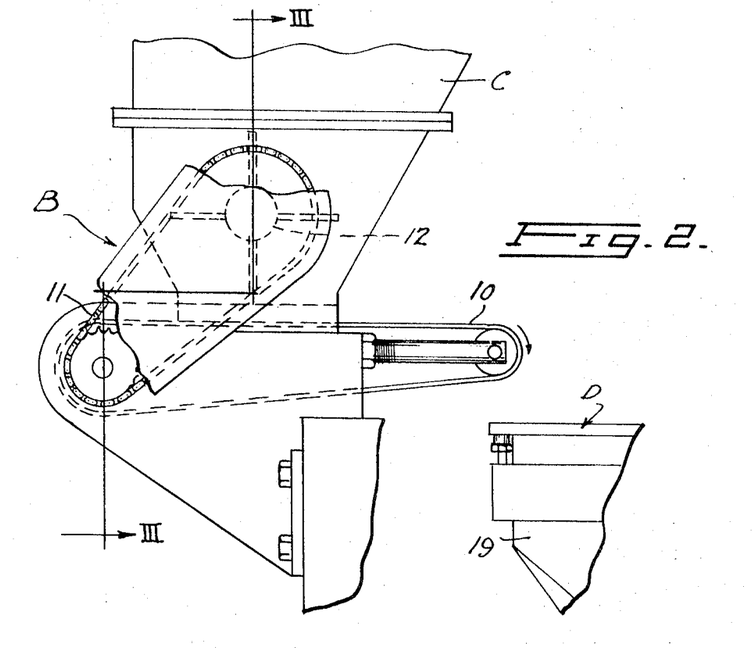
FIG. 2 is a side elevation view of a feeder mechanism which forms part of the machine.
Figure 2:
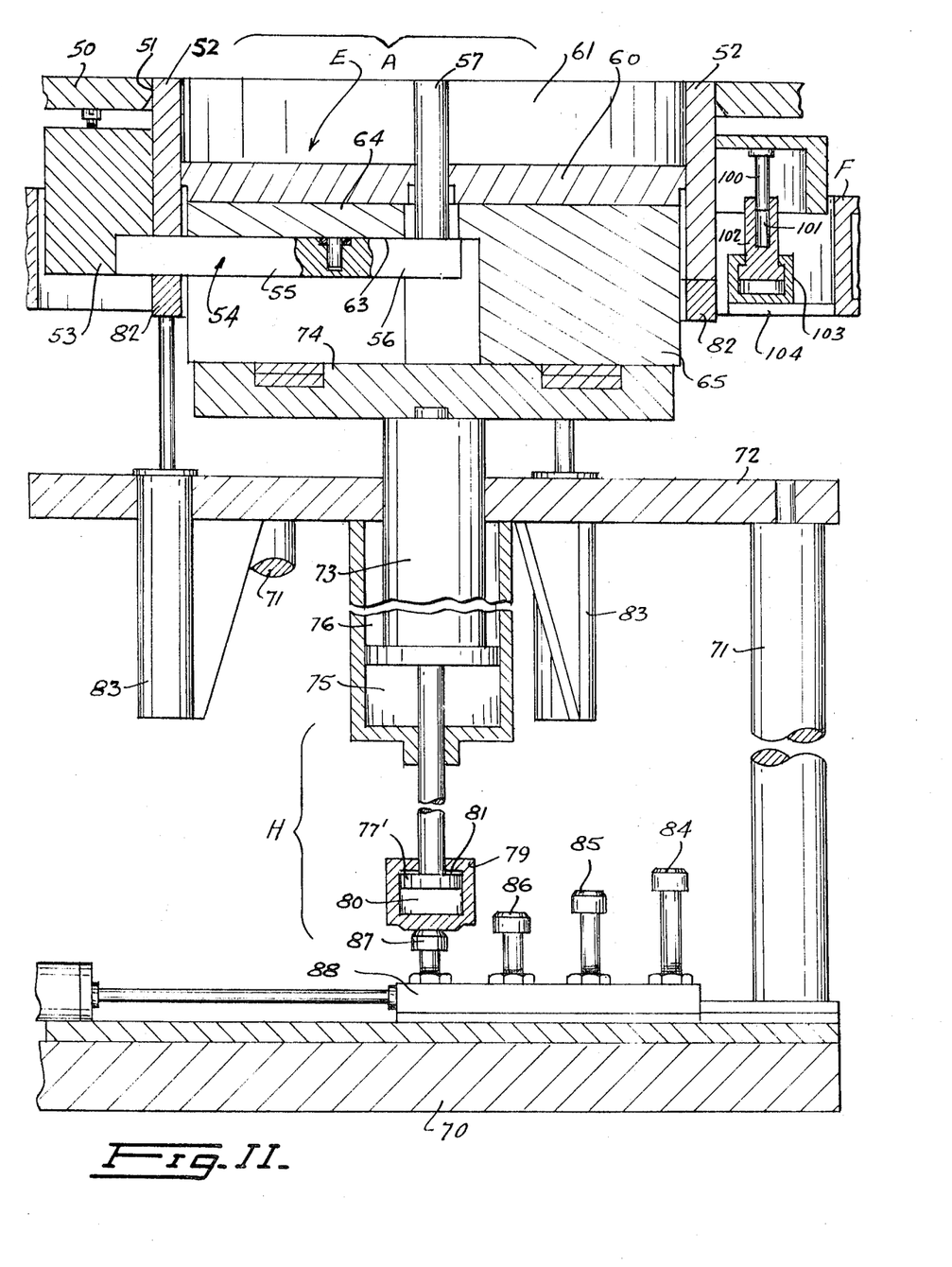
Figures 3, 4, 5:
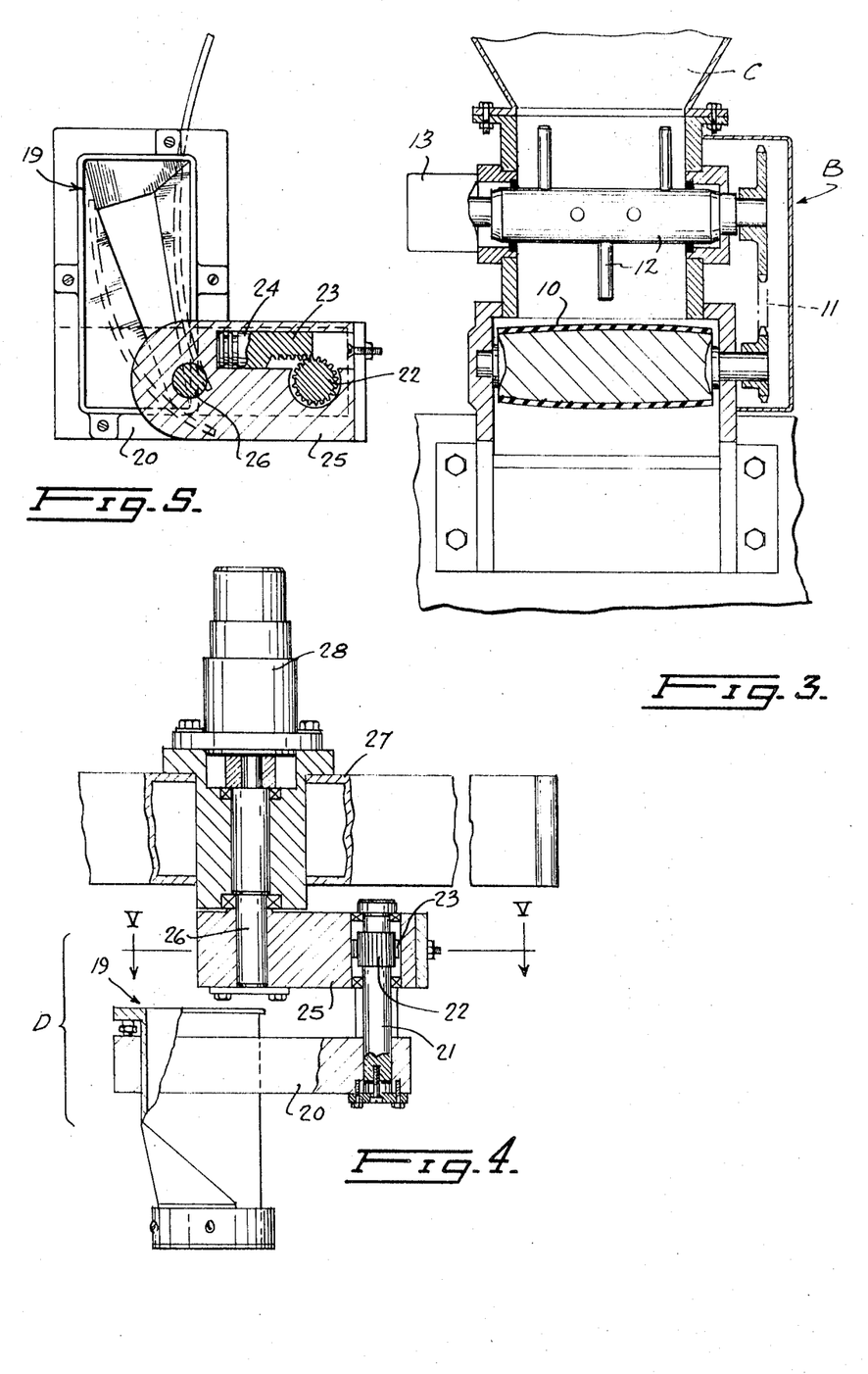
FIG. 3 is a section taken on the line III–III in FIG. 2.
FIG. 4 is an elevation view of a shuttle hopper mechanism which forms part of the machine.
FIG. 5 is a section taken on the line V–V in FIG. 4.

MATERIAL FEEDING ASSEMBLY B (FIGS. 2 and 3)

As seen in FIGS. 2 and 3, this assembly B comprises the input hopper C to receive the mix and from which it is fed by a travelling belt 10 mechanically connected by a chain 11 to a stirring mechanism 12 driven by a motor 13. By intermittently energizing this motor 13 for a preselected length of time, a desired amount of material can be accurately determined and discharged from the free end of the belt 10 into the shuttle hopper mechanism D (FIG. 2). The required volume of this charge of material will vary with the thickness of the grinding wheel to be made and can be readily adjusted by a conventional timer (not shown) controlling the duration of energization of the motor 13.

SHUTTLE HOPPER MECHANISM D (FIGS 4 to 7a)

Figure 6:
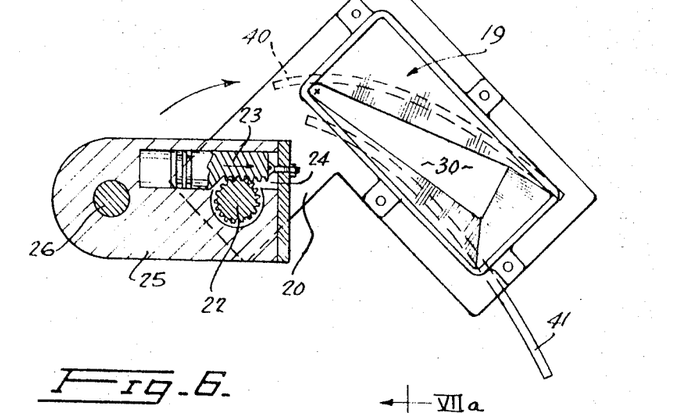
FIG. 6 is a view similar to FIG. 5, but showing the parts in a different position.

As best seen in FIG. 4, a shuttle hopper 19 is mounted on one end of a shuttle arm 20, the other end of which is secured to a spindle 21 that is rotatable through an arc of about 135° between the two positions shown respectively in FIGS. 5 and 6. The spindle 21 carries a pinion 22 that meshes with a rack 23 slidable in a passage 24 of a main arm 25, movement of the rack 23 back and forth in this passage 24 to turn the shuttle arm from one position to the other being controlled by fluid pressure admitted to the appropriate end of the passage. The main arm 25 is secured to a shaft 26 mounted to rotate in the end of a fixed structural member 27 and driven by a motor 28.

Figures 7, 7A:
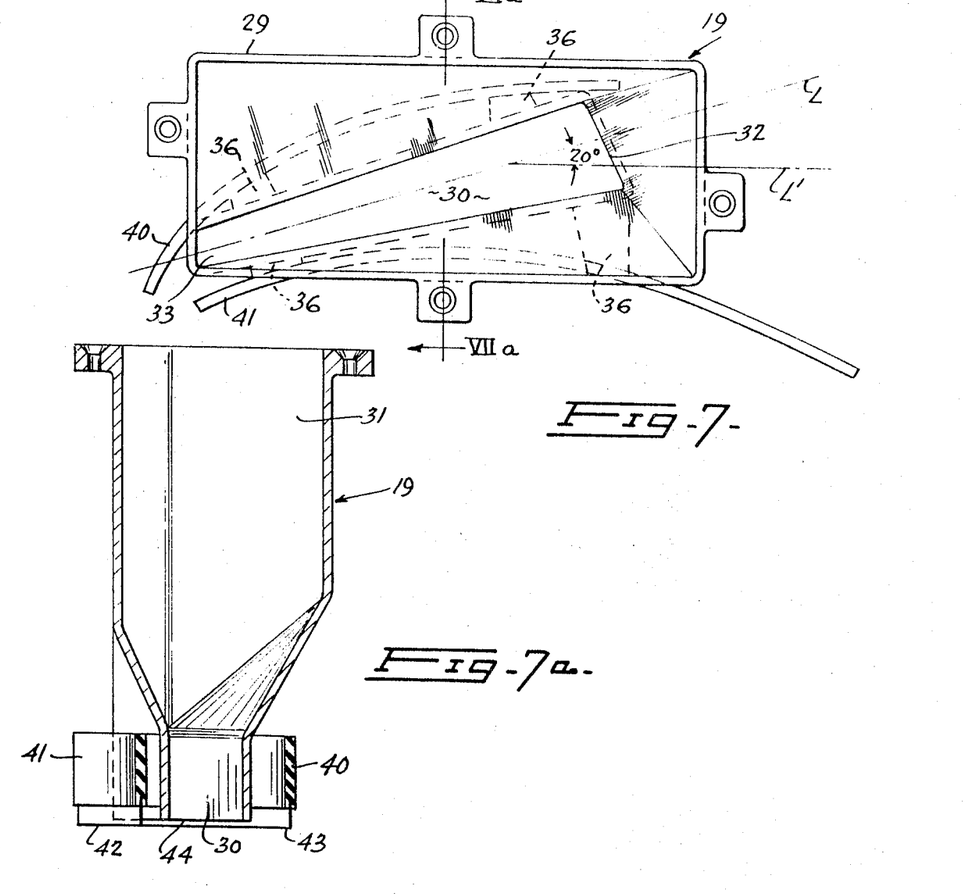
FIG. 7 is a larger scale plan view of the shuttle hopper itself.
FIG. 7a is a section on VIIa–VIIa of FIG. 7.

The shape of the shuttle hopper 19 is complex and is best appreciated from FIGS. 7 and 7a. While the top edges 29 of the walls of this hopper define a rectangular chamber 31 for receiving the charge from the belt 10, these walls are so shaped and sloped as to lead smoothly down to a discharge opening 30 that tapers from a wider, generally rectangular end 32 to a narrower, arcuate end 33, the longitudinal center line L of this "segment-shaped" opening 30 being inclined at about 20° to the center line L' as defined by the top edges 29.

The lower body structure of the shuttle hopper 19 includes projections 36 having flat outer surfaces to which a pair of blades 40 and 41 are secured, one blade extending along each side of the opening 30. These blades 40 and 41 are curved in plan view (FIG. 7) and include edges 42 and 43 (FIG. 7a) of a firm, wear-resistant material, such as polyurethane, that project slightly downwardly of the bottom edge 44 of the opening 30. These blades serve to distribute the material that flows from the opening 30 onto the mold-forming table A in a manner that is described below.

Figure 10:
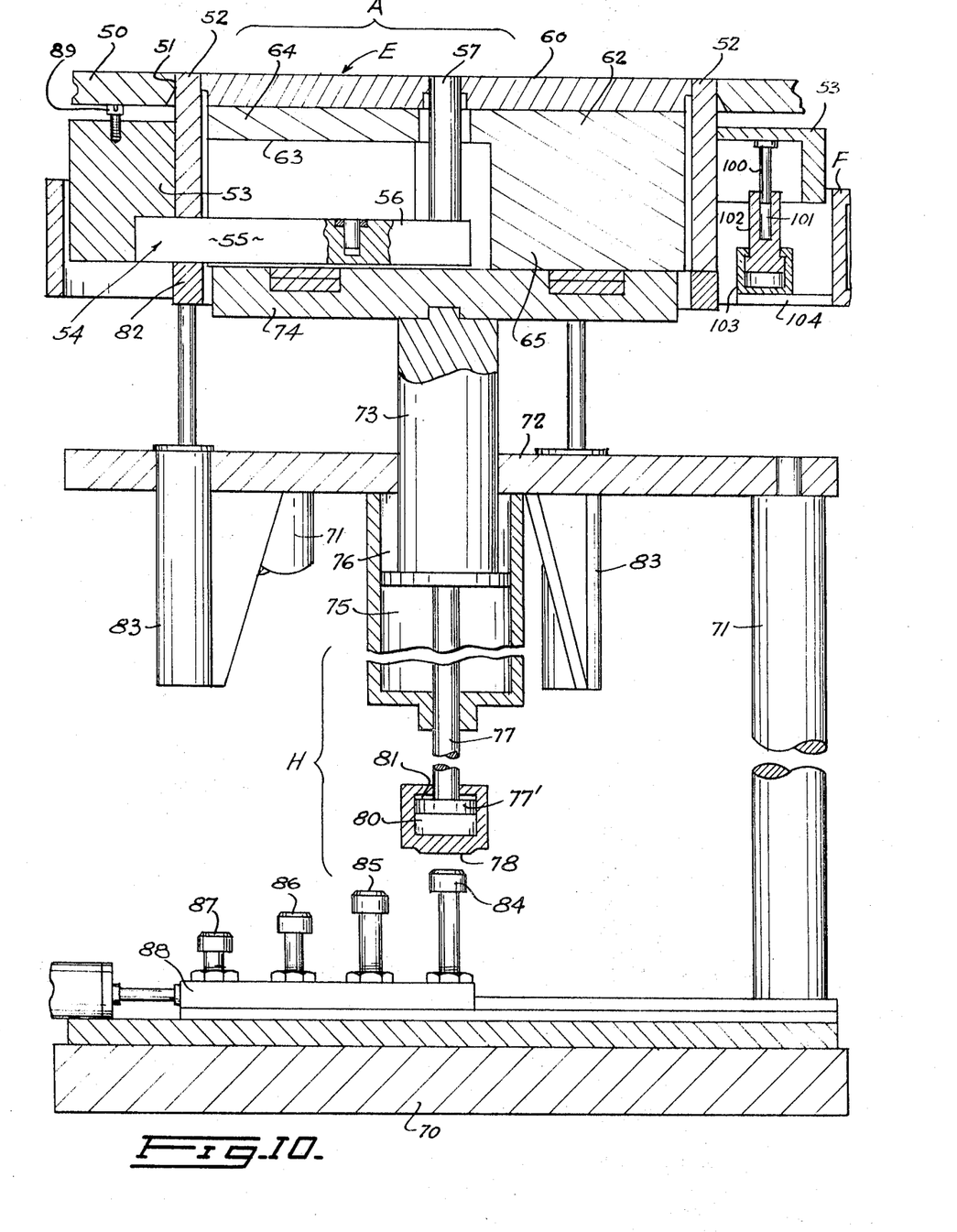
FIG. 10 is a vertical section taken through a mold-forming mechanism which forms part of the machine.

MOLD-FORMING TABLE A AND MECHANISM E (FIGS 10 and 11)

This table A is constituted by a fixed horizontal table top 50 (FIG. 10) formed with a central circular cavity 51 into which one or the other of the mold-forming mechanisms E (or E') can be moved by a rotational movement of the swing arm F on which each such mechanism is mounted and a subsequent vertically upward movement of a portion of such mechanism E. FIG. 10 shows the mold-forming mechanism E so positioned within the cavity 51.

The mechanism E comprises an annular mold band 52 mounted on a base structure 53 of the mechanism E, which base structure 53 is vertically movably mounted on the swing arm F in a manner to be described later. A three-armed spider 54 is secured to the base structure 53, the spokes 55 of which spider support a central hub 56 from which a center pin 57 projects upwards. The upper surface of the pin 57 is flush with the general table surface as defined by the table top 50 and the upper edge of the mold band 52.

Figure 12:
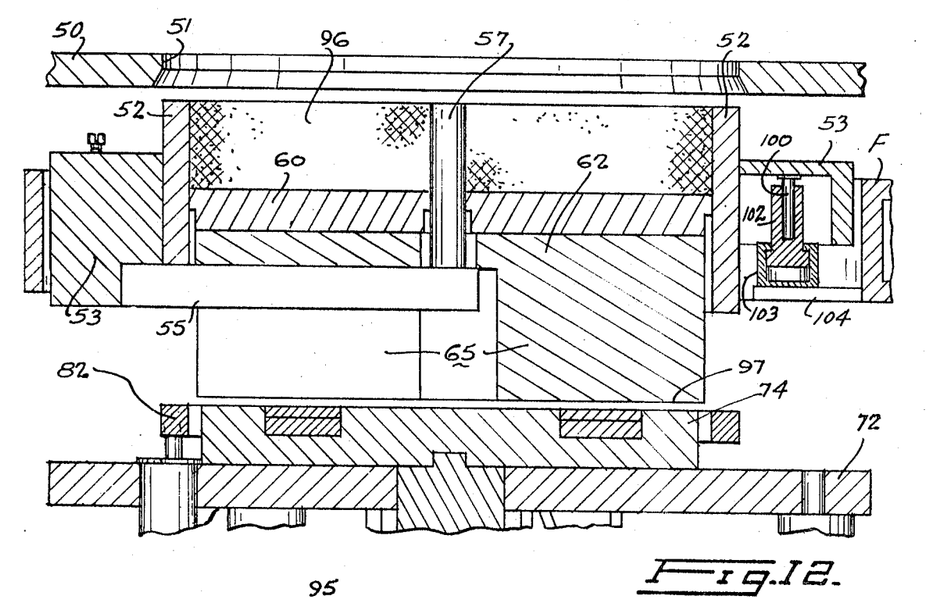
FIG. 12 is another view similar to FIGS. 10 and 11 but with the parts at a later stage in the operation.

It is to be appreciated that FIGS. 10 to 12 are transverse cross sections on a mechanism that is essentially composed of elements that are provided in threes, located at 120° from each other as seen in plan. For simplicity, in most cases only the one of such triplicated elements that is actually cut by the section line has been shown. The other corresponding elements, parts of which should, strictly speaking, be visible in elevation in the background have generally been omitted, or have been shown only in vague outline as in the case of the elements 71 and 83 to be described below.

With the parts in the position of FIG. 10 the continuity of the mold-forming table is completed by a bottom plate 60, the upper surface of which lies flush with the upper edge of the mold band 52. The bottom plate 60 can be lowered, however, to the position seen in FIG. 11, thus defining a mold cavity 61. This lowering action may take place in stages, as will be explained more fully below, but is ultimately limited by abutment against the spokes 55 of the fixed spider 54 of an undersurface 63 of segments 64 of a filler member 62, which member is made of magnetic material and is secured to the plate 60. The thickness of the segments 64 of the filler member 62 thus defines the limit of depth of the cavity 61.

ELEVATING MECHANISM H (FIGS 10 and 11)

Beneath the mold-forming mechanism E there is located an elevating mechanism H that consists of a bed plate 70 from which three pillars 71 project, these pillars supporting a table 72 at their upper ends. At its center the table 72 slidingly supports a piston 73 carrying an electromagnetic plate 74. The piston 73 can be moved up or down by fluid pressure in spaces 75 or 76 respectively, and carries with it a downward extension 77 that terminates ultimately in an end surface 78 formed on a sleeve 79 that is slidable up and down on an enlarged end 77' of the extension 77 under the control of fluid pressure in spaces 80, 81.

Around the outside of the plate 74 but independent thereof there is located a supporting ring 82 that can be moved up and down under the control of three fluid pressure cylinders 83.

The end surface 78 is adapted to cooperate with the heads of a number of positioning studs 84 to 87 that are mounted to project by differing amounts upwardly from a member 88 that is slidable on the bedplate 70 and can be indexed so that any selected one of the studs 84 to 87 is located directly beneath the surface 78. As an alternative to the translatory sliding motion of the indexing member 88, this member can be arranged to rotate to bring each of its studs 84 to 87 sequentially into register with the surface 78.

In the initial position of the apparatus shown in FIG. 10, the supporting ring 82 is forced by the cylinders 83 up tight against an undersurface of the base structure 53 of the mold-forming mechanism E, thus firmly holding the upper edge of the mold band 52 aligned with the table top 50. Adjustable bolts 89 determine this condition accurately. Under this condition each of a number of circumferentially disposed pins 100 connected to the base structure 53 of the mechanism E is drawn upwardly in (but not beyond the end of) a corresponding socket 101 formed in a piston 102 that cooperates with a cushioning cylinder 103 that is mounted by a bracket 104 on the swing arm F.

At the commencement of a mold filling operation, the bottom plate 60 is thus aligned with the upper surface of the table top 50 so that no mold cavity exists. As such operation progresses, two actions are carried out, i.e. a gradual lowering of the bottom plate 60 to form the cavity 61, and a filling of that cavity by the shuttle hopper 19. These actions may take place simultaneously, or the cavity can be formed first and subsequently filled. In any event, these actions will now be described separately for the sake of simplicity.

FORMATION OF THE CAVITY 61 BY MOVEMENT OF THE BOTTOM PLATE 60

As just stated, the bottom plate 60 is initially in its raised position (FIG. 10), and the surface 78 is located above the top level of the longest positioning stud 84, which stud is now positioned in alignment beneath the surface 78. The electromagnet 74 is energized and thus firmly engages the segments 65 of the filler member 62 that are located between the segments 64. The piston 73 is now lowered until the surface 78 abuts the stud 84. The bottom plate 60 is thus drawn down to start to form the cavity 61, which will be simultaneously or subsequently filled with a first charge of mix material, in a manner to be later described. During this time the sleeve 79 carrying the surface 78 is kept extended downwardly by fluid pressure, as shown. When this action has been completed (and perhaps a reinforcing disc laid on the surface of the mix material that now occupies the mold cavity, if the grinding wheel to be made is of the reinforced kind), the sleeve 79 is raised by fluid pressure in the space 81 to free the hitherto tightly abutting surface 78 from the stud 84, the piston 73 being held fixed at this time by maintenance of its fluid conditions. The member 88 is then indexed to bring the next longest stud 85 into alignment beneath the surface 78, the sleeve 79 is relowered and the fluid conditions of the piston 73 are then changed to move it down again until the surface 78 strikes the stud 85, an action which further lowers the bottom plate 60 and hence increases the depth of the cavity 61 by a comparatively small, predetermined amount.

This indexing across of the member 88 with corresponding indexing down of the mold bottom plate 60 continues until the last step has been reached (in the example given, engagement of the surface 78 with the shortest stud 87) and the full desired cavity depth has been achieved. It should also be assumed that the cavity 61 has by this time been filled flush to the surface of the mold band 52 with the grinding wheel mix 96 (FIG. 12). Alternatively, the cavity may only be partly filled (when the grinding wheel being made is to be narrower than the full cavity depth) in which case the last one or two downward indexing steps will not have been accompanied by filling steps.

Figure 8:
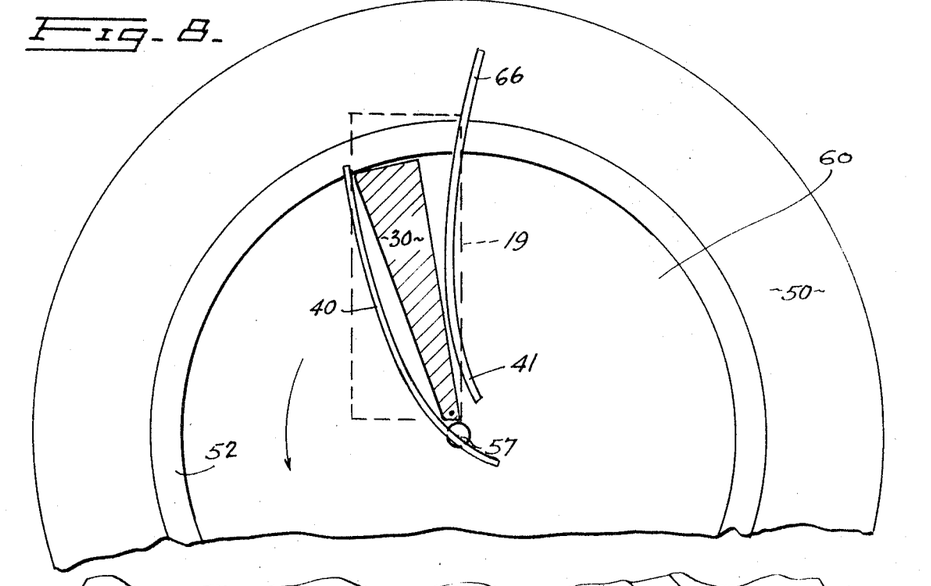
FIG. 8 is a diagram showing the path traced out by the shuttle hopper in relation to the mold-forming table, the hopper being in a first orientation.
Figure 9:
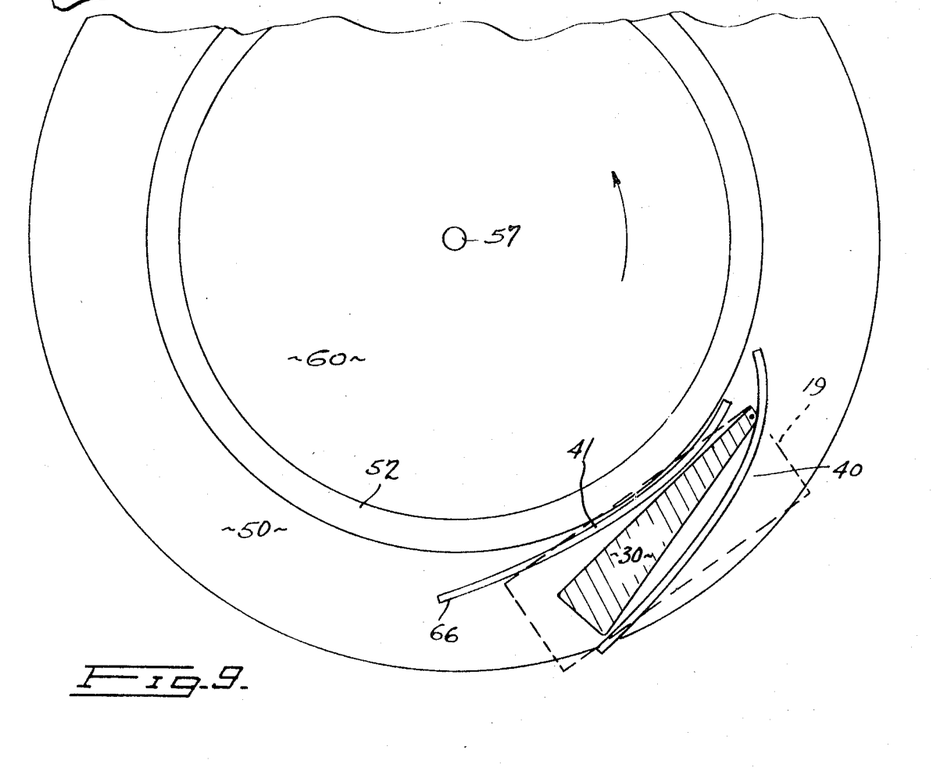
FIG. 9 is a diagram similar to FIG. 8 but with the hopper in a second orientation.

OPERATION OF THE SHUTTLE HOPPER 19 (FIGS. 8 and 9)

The shuttle hopper 19 has two extreme positions, an inward, "filling" position shown in FIG. 8 and an outer, "withdrawn" position shown in FIG. 9, transition from one position to the other being achieved by rotation of the spindle 21 between its extreme positions.

In the transfer of a charge of mix material from the shuttle hopper 19 to the cavity 61, the hopper 19 is located in its inner position and the main shaft 26 is rotated. The vertical axis defined by the shaft 26 extends approximately through that of the center post 57. The discharge opening 30 is thus caused to orbit around the space defined between the mold band 52 and the center post 57 (FIG. 8), which movement results in uniform distribution of the material. The shuttle hopper 19 makes a number of revolutions during or after each lowering of the bottom plate 60 to form each portion of the grinding wheel in the mold cavity 61, the size of the charge of material having been preselected to ensure that it will fill the cavity as it then exists with a small amount of excess.

To remove this excess, once the cavity has been uniformly filled by the orbital movement above-described, the pinion 22 is rotated to swing the shuttle hopper, 19 towards its outer position (FIG. 9). This outward swinging movement is comparatively slow, and the main shaft 26 continues to rotate while the swinging movement is taking place. There will be about three or four complete rotations of the whole assembly while this outward swinging movement is in progress, with the result that each portion of the shuttle hopper opening 30 is caused to move in an approximately spiral path during its transition from the FIG. 8 to the FIG. 9 position. This outwardly spiralling movement has the effect of causing the blades 40, 41 to wipe over and beyond the periphery of the cavity and of smoothly and evenly wiping clear the excess material to leave the surface of the material in the cavity truly flush with the mold band 52. It will be noted that even in the inward position a portion 66 of the inner blade 41 always engages the mold band 52, so that there is no danger of the blades 40, 41 or of any other part of the shuttle hopper mechanism ever moving down into the cavity 61.

It should be mentioned that to receive a fresh charge of material from the belt 10 (FIG. 2) the shuttle hopper 19 will be returned to its inward position and rotated by the main shaft 26 until it is located beneath the discharge end of the belt 10, whereupon the shaft 26 is stopped while the belt 10 moves. Upon completion of transfer of this charge by stopping of the belt 10, the shaft 26 recommences rotation to orbit the shuttle hopper 19 again.

As is standard practice in machines of this general type, the relative timing of all the various operations that have been described will be controlled by a suitable timing mechanism. Since the nature of such mechanism is conventional, and, since the basic timing relationships that it is called upon to produce are fully explained in this description, it is believed unnecessary to illustrate or describe such mechanism in further detail herein.

Figure 13:
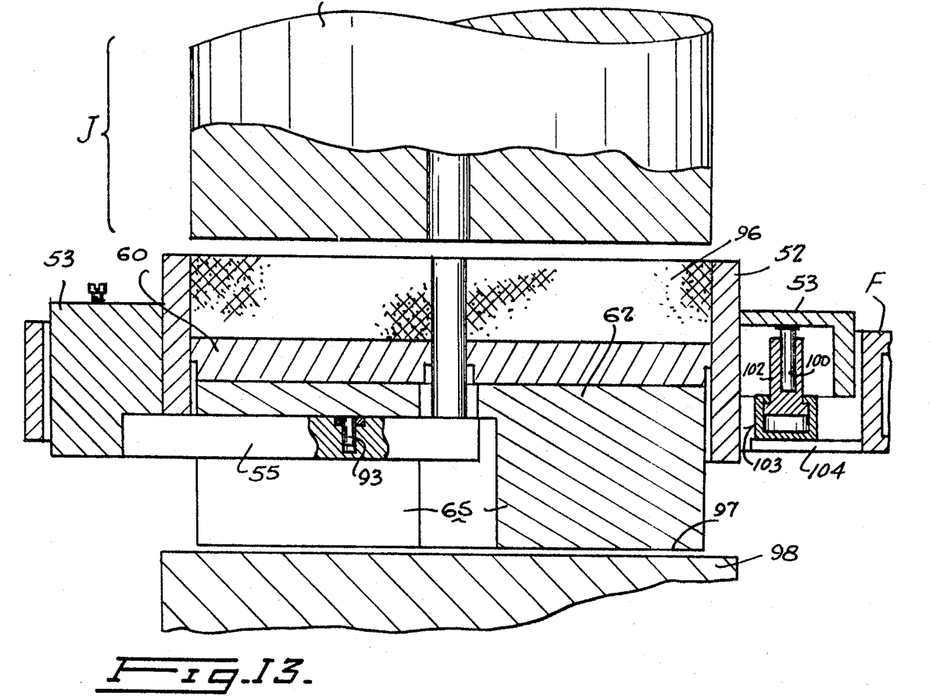
FIG. 13 is a vertical section showing the operation of a press portion of the machine.

TRANSFER OF THE FILLED MOLD TO THE PRESS J (FIGS. 11 to 13)

To transfer the filled cavity (which term is used to include a partly filled cavity) to the press J requires a portion of the mold-forming mechanism E to be lowered from beneath the table A. This is accomplished by lowering the supporting ring 82 (FIG. 12), which permits the structure 53 to move downwardly under gravity within the swing arm F, the pins 100 sliding into their sockets 101. This movement enables the mechanism E to drop down the necessary distance, i.e. until the upper edge of the mold band 52 is below the lower surface of the table top 50 (FIG. 12). During this time the plate 74 is fully retracted downwardly out of contact with the segments 65 of the filler member 62, the electromagnet in the plate 74 having been deenergized.

With the elevating mechanism H thus retracted out of the way and the mechanism E clear of the table top 50, the swing arm F is turned through 180° by a conventional mechanism not shown in detail (for example a rack and gear) to bring the now charged mechanism E to a location directly beneath the ram 95 of the press J (FIG. 13).

OPERATION OF THE PRESS J (FIG. 13)

The press J includes a firm bedplate 98 and the ram 95 which is fluid-pressure operated in a conventional manner descends into the mold cavity defined by the mold band 52 and compresses the material 96 therein to about a half of its former volume. During this time the structure 53 of the mechanism E can yield in relation to the swing arm F by virtue of the cushioning cylinders 103, so that the mold band 52 can move downwardly to the extent permitted by these cylinders, an extent that will be determined by the fluid pressure maintained in such cylinders. Downward movement of the bottom plate 60 is however limited to taking up the small gap between the bedplate 98 and the undersurface 97 of the segments 65 of the filler member 62. Hence the mold band 52 can move down further than the bottom plate 60. This provision for differential downward movement of the mold band 52 during pressing is important, because the edges of the now compressed mix 96 tend to cling firmly to the mold band 52 and drag it down as the mix is compacted.

There will be an effort by the cushioning cylinders 103 to move the mold band 52 back upwardly again, as soon as the pressure of the ram 95 has been removed, with a corresponding tendency for the mold band 52 to lift the compressed product (which is now effectively a single rigid unit). Since this action would tend to form a gap between the underside of the product and the bottom plate 60, a fluid operated piston 93 is provided in each spoke 55 for raising, at this stage in the operation, the filler member 62 and hence the bottom plate 60 relative to the spokes 55 and hence relative to the mold band 52.

EJECTION

After pressing, the movement of the swing arm F is reversed, the other mold-forming mechanism E' having been filled in the already described manner at the table A while the pressing operation was taking place. Mechanism E' is thus presented to the press J, while mechanism E containing the compressed product is returned to its original station above the elevating mechanism H. The latter is then reactuated to move upwardly, the plate 74 forcing the bottom plate 60 upwardly to eject the compressed product and again lie flush with the table top 50 in readiness for commencement of a fresh-filling operation.

We claim:

1. In a machine for use in the manufacture of grinding wheels, a mold-forming assembly for receiving granular material from a shuttle hopper, said assembly comprising:
   a. a base structure,
   b. an annular mold band mounted on said base structure to define a cylindrical space,
   c. a center pin mounted on said base structure to project axially upwardly in said space,
   d. and a movable bottom plate mounted within said space around said center pin and vertically slidable between an upper position and a lower position, said bottom plate having an upper horizontal surface that, in said upper position, lies flush with an upper surface of said center pin and an upper surface of said mold band, and that, in said lower position, forms a mold cavity within said mold band, including
   e. means for lowering said bottom plate within said space sequentially to each of a series of successively lower positions for forming said cavity successively deeper.

2. In a machine for use in the manufacture of grinding wheels, a mold-forming assembly for receiving granular material from a shuttle hopper, said assembly comprising:
   a. a base structure,
   b. an annular mold band mounted on said base structure to define a cylindrical space,
   c. a center pin mounted on said base structure to project axially upwardly in said space,
   d. and a movable bottom plate mounted within said space around said center pin and vertically slidable between an upper position and a lower position, said bottom plate having an upper horizontal surface that, in said upper position, lies flush with an upper surface of said center pin and an upper surface of said mold band, and that, in said lower position, forms a mold cavity within said mold band, including
   e. a table structure closely surrounding said mold band and having a horizontal upper surface flush with said upper surface of the mold band, f. a press positioned remote from said table structure and including a ram for entering said cavity to compact granular material therein,
g. and means mounting said mold-forming assembly for vertical downward and subsequent horizontal movement away from said table structure and to said press for location of said cavity beneath said ram.

3. A machine according to claim 2, including
h. a mold-filling assembly mounted on said table structure for evenly distributing granular material into said mold cavity.

4. The machine of claim 3, wherein said mold-filling assembly comprises
i. a shuttle hopper defining a chamber for receiving said granular material and having an elongated bottom opening for discharge of the same therefrom,
j. said shuttle hopper including blade means extending generally parallel to the longitudinal direction of said elongated opening, said blade means being mounted on the shuttle hopper laterally of said opening to project downwardly therefrom to said table structure,
k. means mounting said shuttle hopper in a filling position on said table structure for passage of said material through said opening into said cavity,
l. said mounting means including means for rotating said shuttle hopper about a first vertical axis extending approximately centrally of said cavity to orbit said opening around the cavity with the longitudinal direction of the opening extending generally radially of the cavity during said passage of the material therethrough,
m. said mounting means further including means for moving said shuttle hopper from said filling position to a withdrawn position by swinging about a second vertical axis displaced from said first axis to swing said opening about the second axis simultaneously with its orbiting about the first axis to cause each portion of such opening to move in an approximately spiral path after passage of the material into the cavity to cause said blade means to wipe over said cavity and radially outwardly beyond the inner periphery of said mold band to form a smooth upper surface on the material in the cavity.

5. A machine according to claim 4, wherein
n. said opening is so shaped as to taper inwardly towards said first axis when said shuttle hopper is in said filling position, and
o. said blade means comprise a pair of curved blades secured to said shuttle hopper one on each side of said opening, said blades being curved convexly towards the direction of rotation of the shuttle hopper about said first axis,
p. one of said blades including an extended portion resting on said mold band in both said filling and withdrawn positions.

6. A machine according to claim 2, wherein said means mounting the mold-forming assembly for movement to a location beneath said ram includes resilient means extending between said mounting means and said annular mold band to enable said mold band to move downwardly relatively to said bottom plate during a pressing operation.